United States Patent Office 2,739,038
Patented Mar. 20, 1956

2,739,038

WATER SOLUBLE ORTHO PHOSPHATES

Erich Heinerth, Dusseldorf-Gerresheim, Germany, assignor to Henkel & Cie. G. m. b. H., Dusseldorf-Holthausen, Germany, a corporation of Germany No Drawing. Application August 5, 1952,
Serial No. 302,837

Claims priority, application Germany August 16, 1951

10 Claims. (Cl. 23—107)

This invention relates to water soluble orthophosphates.

When reacting superphosphates with sulfate solutions and especially solutions of sodium sulfate, there are obtained, as is well known, weakly phosphoric acid monophosphate lyes. These are neutralized or in other manner worked up to form the mono-, di- or tri-phosphate stage after the removal of the calcium sulfate which, on the one hand, separates during the reaction and, on the other, is already contained in the superphosphate. The removal by filtration of the calcium sulfate from the concentrated phosphate lye and the washing of the filtered calcium sulfate is usually carried out in a continuous manner, or, discontinuously in stages by the treatment of the filter cake with phosphate lyes of lesser concentration or with water. It has been found that not all commercial superphosphates are suitable to be converted to water soluble salts of orthophosphates in accordance with the above described method. Some of these materials yield difficultly filterable calcium sulfate sludges. The filters become rapidly clogged up and will then not permit any more lye to pass through even with relatively thin calcium sulfate layers.

In accordance with the invention, the reaction of superphosphates with sulfate solutions is carried out in the presence of salts of bi-valent metals, these salts being substantially soluble under the reaction conditions, i. e. under conditions of temperature and concentration of reactants. The then resulting calcium sulfate sludge is of vastly improved filterability.

The reaction of superphosphate with sulfate solution and preferably alkali sulfate solution is carried out in the conventional well-known manner. Bi-valent metals, the salts of which are suitable, in accordance with the invention, are particularly those of zinc, iron, copper and, for best results, magnesium. Additions of bi-valent metal salts not exceeding 5% and preferably of from 1% to 2% calculated as metal oxide by weight of water soluble phosphorous pentoxide of the superphosphate will usually suffice.

For the purpose of obtaining particularly efficient operations, it is recommended to use the bi-valent metal salts, in accordance with the invention, in the form of by-products or waste products. A number of superphosphates, for instance, possess such high magnesium contents that it is possible to mix the same in suitable proportions with another superphosphate normally giving a difficultly filterable calcium sulfate sludge. In this manner, the requisite amount of magnesium salt is introduced to be present in the conversion reaction.

After filtration, an alkali monophosphate lye is obtained which contains the added bi-valent metal salts. When further working the same to obtain di-alkali phosphates, these lyes are neutralized, whereupon the bi-valent metal salts separate in the form of difficultly soluble precipitates. It is then further possible to take an appropriate amount of this precipitate and dissolve the same in, for instance, sulfuric acid, thereupon, the resulting solution may be again admixed with the initial reactants in the practice of the invention.

The following examples are furnished by way of illustration and not of limitation:

Example I 6000 kg. of a superphosphate normally yielding a difficultly filterable sludge were stirred in an acid-proof stirring vessel at a temperature of about 80° C. with 6 cubic meters of a washing lye derived from a previous run and containing about 60 g. per liter of phosphorpentoxide content, there being then added to the mix 660 kg. of water-free sodium sulfate. There was then added 60 kg. of $MgSO_4 \cdot 7H_2O$. Stirring was continued for an hour at 80° C. and the resultant mass was then subjected to filtration on a rotary filter. Filtration proceeded in normal filtration time for the type of filter used in contrast to 3 to 4 times the filtration time on the same filter for the sludge derived from the superphosphate reaction carried out in the absence of magnesium sulfate.

For the purpose of obtaining numerical values relatively independent from the dimensions of a particular filtration device used, the following testing method was established: 2 kg. each of initial mix were passed at 80° C. on to a Büchner funnel of 25 centimeter diameter and provided with the conventional filter paper, suction of 400 mm. mercury being applied to the funnel. There is then measured by stopwatch, the time elapsing until the first occurrence of cracks in the filter cake. On this basis, the superphosphate specified in Example I gave filtering periods of from 25 to 30 minutes. By the addition of magnesium sulfate, these filtering periods could be lowered to 7–8 minutes. If in Example I the magnesium sulfate was replaced by the heptahydrate of zinc sulfate or the heptahydrate of iron sulfate, the same lowered filter values were obtained. Substituting identical amounts of copper sulfate pentahydrate filtering periods further lowered by about 1 minute were obtained.

Example II

The difficultly filterable superphosphate as used in Example I which contained 1.1 parts by weight of magnesium oxide for 100 parts by weight of water soluble phosphorpentoxide was mixed in a ratio of 1:1 with another specially prepared superphosphate derived from a raw phosphate rich in magnesium and containing 5 parts by weight of magnesium oxide for every 100 parts by weight of phosphorpentoxide. The superphosphate was then reacted as set forth in accordance with Example I. The resulting filter periods were from 5 to 6 minutes.

Example III

The difficultly filterable superphosphate of Example I was reacted as there described except that, in this case, there was added prior to the addition of sodium sulfate, the conversion product derived from 60 kg. of filter moist neutralization sludge derived from a preceding run and 60 kg. of sulfuric acid of 60° Bé. Filtering times were from 8 to 10 minutes.

As salts of bivalent metals forming easy soluble sulfates, salts of sulfuric, phosphoric, hydrochloric, nitric or acetic acid may be used. For the technical performance of the invention, the sulfates and the monophosphates are the most important ones. When the alkaliphosphates produced according to this invention serve as starting materials for the production of meta-, pyro- or polyphosphates, the nitric acid salts of bivalent metals may be added. These salts act as oxidizing agents for impurities during the calcination of the alkali orthophosphates.

The salts of bivalent metals should be added in such an amount, that at least 0.5 parts by weight of metal oxide are present for 100 parts by weight of phosphorpentoxide.

The filter paper, used in testing the filtration time, is one of the kind used in the analytic laboratory for filtering easy-filterable precipitates.

The term "superphosphate" as employed in the specification and claims is used in the conventional manner to designate the product which results from the conversion of mineral calcium phosphate (consisting principally of $Ca_3(PO_4)_2$) with sulfuric acid. Thus, by "superphosphate" is meant a mixture consisting principally of monocalcium phosphate ($Ca(H_2PO_4)_2$) and essentially water-free calcium sulfate ($CaSO_4$).

I claim:

1. In the conversion of superphosphates with sulfate solutions, the improvement which comprises reacting a superphosphate, normally yielding on sulfate conversion a difficultly filterable calcium sludge, with alkali sulfate solution in the presence of a salt of a bi-valent metal substantially soluble in the liquid component of the reaction mix to thereby obtain readily filterable calcium sludge said bivalent metal salt being present from 0.5–5.0%, calculated as metal oxide, by weight of water soluble phosphorpentoxide in said superphosphate, and removing said sludge by filtration.

2. Improvement according to claim 1 in which said bivalent metal salt is present in from 1–5%, calculated as metal oxide, by weight of water soluble phosphorpentoxide in said superphosphate.

3. Improvement according to claim 1 in which the metal radical of said bi-valent metal salt is a member of the group consisting of zinc, iron, copper and magnesium.

4. Improvement according to claim 3 in which said bivalent metal salt is present in from 1–5%, calculated as metal oxide, by weight of water soluble phosphorpentoxide in said superphosphate.

5. Improvement according to claim 1 in which said bivalent metal salt is a magnesium salt present in from 1–5%, calculated as metal oxide, by weight of water soluble phosphorpentoxide in said superphosphate.

6. Improvement according to claim 5 in which said bivalent metal salt is present in from 1–2%, calculated as metal oxide, by weight of water soluble phosphorpentoxide in said superphosphate.

7. Improvement according to claim 1 in which said bivalent metal salt is present in the form of a superphosphate containing the same and in amount of from 1 to 5%, calculated as metal oxide, by weight of water soluble phosphorpentoxide in total superphosphate present.

8. Improvement according to claim 7 in which the metal radical of said bi-valent metal salt is a member of the group consisting of zinc, iron, copper and magnesium.

9. Improvement according to claim 7 in which said bivalent metal salt is a magnesium salt present in from 1–5%, calculated as metal oxide, by weight of water soluble phosphorpentoxide in said superphosphate.

10. Improvement according to claim 9 in which said bivalent metal salt is present in from 1–2%, calculated as metal oxide, by weight of water soluble phosphorpentoxide in said superphosphate.

References Cited in the file of this patent

UNITED STATES PATENTS

| | | |
|---|---|---|
| Re. 20,994 | Larson | Jan. 31, 1939 |
| 879,843 | Wallerstein | Feb. 18, 1908 |
| 1,191,615 | Ross | July 18, 1916 |
| 1,372,051 | Tromp | Mar. 22, 1921 |
| 1,713,868 | Edwards | May 21, 1929 |
| 1,810,858 | Thorsell | June 16, 1931 |
| 1,952,289 | Schoch | Mar. 27, 1934 |
| 2,018,955 | Heckert | Oct. 29, 1935 |
| 2,038,072 | Wilson | Apr. 21, 1936 |
| 2,053,432 | Harvey | Sept. 8, 1936 |
| 2,063,029 | Coleman | Dec. 8, 1936 |
| 2,280,451 | Riddle | Apr. 21, 1942 |
| 2,437,182 | Barr | Mar. 2, 1948 |
| 2,531,977 | Hammaren | Nov. 28, 1950 |

OTHER REFERENCES

Smith: "Inorganic Chemistry" (2nd ed.), page 729, Appleton Century Co., N. Y., 1937.

Hackh's Chemical Dictionary, page 823. Blakiston Company, Philadelphia, 1944 (2nd ed.).

Collings: "Commercial Fertilizers," page 181, Blakiston Company, Philadelphia, 4th ed., 1947.

Norwell: "Water Treatment," pages 66, 68, 69, 76, Reinhold Publishing Co., N. Y., 1951.